Jan. 14, 1936. F. J. LA LONDE 2,027,869
DRUM PEDAL
Filed April 28, 1934
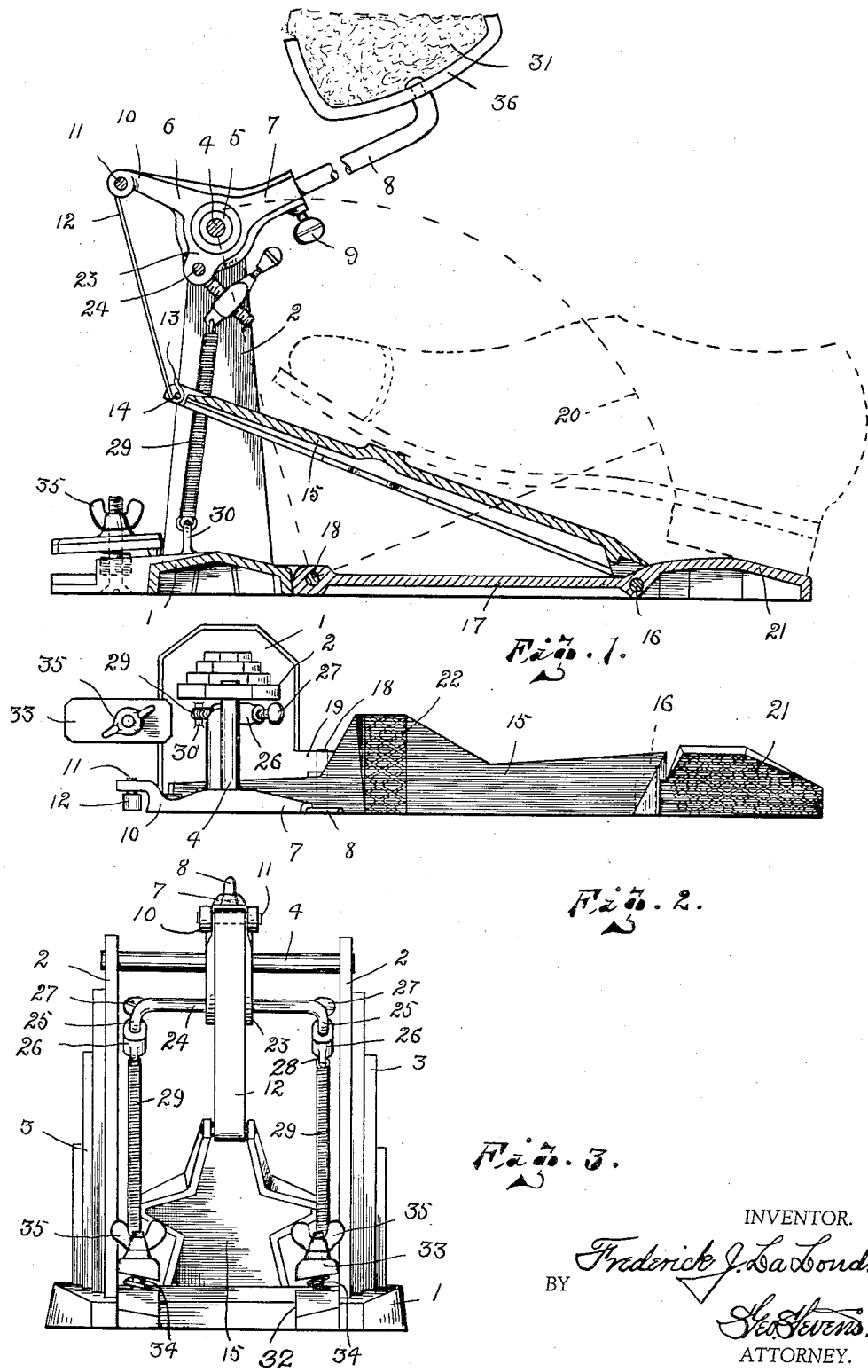
INVENTOR.
Frederick J. La Londe,
BY
Geo Stevens.
ATTORNEY.

Patented Jan. 14, 1936

2,027,869

UNITED STATES PATENT OFFICE 2,027,869

DRUM PEDAL

Frederick J. La Londe, Virginia, Minn., assignor to Gordon E. Thomas and Ernest R. Thomas, both of Virginia, Minn.

Application April 28, 1934, Serial No. 722,978

2 Claims. (Cl. 84—422)

This invention relates to foot pedals for base drums, the principal object being to provide a more practical and efficient device of this character.

Other objects and advantages of the invention will appear in the following description thereof.

Referring now to the accompanying drawing, forming part of this application, and wherein like reference characters indicate like parts:

Figure 1 is a vertical central section of one of the improved foot pedals showing parts thereof in elevation.

Figure 2 is a top plan view of one-half of the pedal, with the beater removed.

Figure 3 is a front elevation of the device with the beater omitted.

The entire frame work of the device is preferably made of light material such as aluminum, and illustrated as being cored out where convenient to augment its lightness. The numeral 1 represents a somewhat elevated principal base portion of the device, substantially rectangular in form in plan view and elongated transversely of the pedal portion thereof. Adjacent either end of this base portion is an upright member or column 2, reinforced more for appearance than anything else by the graduated integral columns 3 and all of which are slightly tapered upwardly.

Transverse the upper end of the columns 2 and fixed therein is the shaft 4 having first mounted centrally thereupon a suitable bearing indicated at 5 which carries the beater arm hub 6 so that the hub is thus as sensitively mounted as possible upon the shaft 4.

The hub 6 has a radial extension 7 forming a socket for the arm 8 of the beater and the latter is removably held therein as by a suitable thumb screw 9, while extending from the upper portion of the hub 6 in the opposite direction is the crank arm 10 carrying in the outer end thereof the pin 11 upon which the metal strap 12 is pivotally carried. The outer end of the crank arm 10 is preferably bifurcated and carries the upper end of the strap 12 intermediate of said bifurcated portion.

The outer end of the strap 12 is hooked as at 13 and readily engaged or disengaged with the pin 14 transverse the bifurcated forward end of the tread 15 and this tread is normally inclined downwardly and rearwardly to the point where it is pivotally mounted upon the transverse pin or shaft 16 carried within the rearwardly extending pivotal portion 17 of the base. This portion 17 is pivotally mounted as at 18 in a bifurcated extension 19 centrally of the rear edge of the base portion 1. This pivotal connection of the extension 17 with the base is for the purpose of convenient folding of the device for shipment or storage and the line of collapsibility is indicated by the dotted lines 20 showing the position of the upright portion of the pedal frame in respect to the extension 17 when lying flat. The extension 17 has a further extension and enlargement in the form of a heel support 21 which is somewhat elevated in respect to the intermediate portion thereof between the base 1 and the enlargement 21 which latter is arched upwardly so that the highest portion thereof is centrally located transverse the heel portion, making a convenient rest for the heel of the operator, readily susceptible of rocking motion on such elevated portion, while upon the tread 15 and transverse the approximate center thereof is an elevated strip indicated at 22 for convenient engagement by the sole of the operator's shoe. To insure positive contact of the shoe to both the heel portion and tread I have illustrated these surfaces as being knurled or corrugated in some convenient and practical manner.

Depending from the hub 6 and approximately midway between the crank arm 10 and extension 7 is a somewhat shorter extension 23 of said hub carrying fixed therein the transverse shaft 24, it having no other bearing or support but extending laterally in opposite directions towards the columns 2 and bent backwardly and downwardly forming inclined terminals 25 upon each of which is mounted a slidable keeper 26 held as by means of a suitable thumbscrew 27 for longitudinal adjustment on their respective terminals, and the undermost portion of each keeper 26 is attached as at 28 to a contractile helical spring 29, the opposite end of which is attached to a suitable lug 30 formed integral or otherwise attached to the upper surface of the base portion 1 just inside of each column 2. When thus connected a constant downward stress is applied to the shaft 24 holding the hub 6 in its extreme clockwise rotatable direction holding the beater 31 away from the head of the drum to which the device is attached and at the same time keeping the tread 15 in its uppermost inclined position as illustrated in the drawing.

Now the means for applying the pedal to a drum comprises two suitably spaced clamps, each comprising a pair of jaws 32 and 33, the former being integral with the base portion 1 and the latter adjustable vertically upon the screw 34 extending upwardly through the base jaw 32 and carrying suitable thumbscrews 35 thereupon, it being normally biased upwardly as by a suitable helical expansive spring about the screw 34. These clamps are formed with jaws having faces inclined downwardly and towards each other as seen in Figure 3 to forcibly impinge the circular rim of the drum shell to which it is applied.

As a preferred connection of the beater arm to the beater I have shown a U-shaped member 36 as being riveted directly to the turned end of the arm 8. By this construction of foot pedal it is evident that the beater is supported in such a manner as to engage the head of the drum without the beater arm and its attachment passing beyond a vertical line with the center of the beater supporting shaft 4, and the relative position of the connections 11 and 24 are such as to hold the beater in its farthermost position from the head of the drum when the tread 15 is in its uppermost position with the least stress upon the springs and consequently requiring the least initial effort possible to accomplish action of the beater to permit of the latter being held in close juxtaposition to the head of the drum for a short and light engagement therewith with as little effort as possible on the part of the operator, and adding to the sensitivity of the device.

Furthermore it will be noted by utilization of two helical springs 29 the dependability of the device is doubled in that one may become broken or inactive without materially effecting the operation of the device, and that the keepers 26, being adjustable, permits of easy regulation of the power necessary for operation of the mechanism so that in the event of tension of the springs being more than is required for example when operated by a child or lady, one spring may be dispensed with entirely by the least possible effort on the part of the operator.

Having thus described my invention, what I claim and desire to secure by Letters Patent, is:

1. A foot pedal for drums comprising a base portion, spaced columns extending upwardly from said base portion, a tread pedal pivotally mounted upon said base portion and extending intermediate of said columns, a hub pivotally carried in the upper ends of said columns, a beater arm adjustably carried in said hub, a transverse shaft having bent ends and supported in said hub, spring means attached at one end to said bent ends and at the other end to the base portion, and a strap pivotally attaching the tread pedal and beater arm.

2. A foot pedal for drums comprising a two-part foldable base portion, spaced columns integral with one part of said portion, a hub pivotally supported by and intermediate of said columns, a beater arm adjustably carried in said hub, a transverse shaft having bent ends carried by said hub, beneath the pivotal support of the latter, a pair of slidable keepers adjustably mounted upon the bent ends of said shaft, springs secured at one end to said keepers and at the other end to said base, and a tread pedal pivotally attached to the other part of said base and means connecting the other end of said tread pedal to said beater.

FREDERICK J. LA LONDE.